United States Patent [19]

Ono et al.

[11] Patent Number: 4,489,691
[45] Date of Patent: Dec. 25, 1984

[54] METHOD AND APPARATUS FOR CONTROLLING THE IGNITION TIMING OF AN INTERNAL COMBUSTION ENGINE

[75] Inventors: Hironobu Ono, Toyota; Jiro Nakano, Okazaki; Masaomi Nagase, Toyota, all of Japan

[73] Assignee: Toyota Jidosha Kogyo Kabushiki Kaisha, Toyota, Japan

[21] Appl. No.: 551,505

[22] Filed: Nov. 14, 1983

Related U.S. Application Data

[63] Continuation of Ser. No. 304,561, Sep. 22, 1981, abandoned.

[30] Foreign Application Priority Data

Sep. 25, 1980 [JP] Japan .................................. 55-132271

[51] Int. Cl.³ .............................................. F02P 5/14
[52] U.S. Cl. ...................................... 123/424; 123/422; 123/423
[58] Field of Search ............. 123/179 B, 179 BC, 424, 123/421, 422, 423, 407

[56] References Cited

U.S. PATENT DOCUMENTS

| 4,351,297 | 9/1982 | Suematsu | 123/424 |
| 4,359,988 | 11/1982 | Matsubara | 123/424 |
| 4,416,234 | 11/1983 | Ikeura | 123/424 |

FOREIGN PATENT DOCUMENTS

| 2551610 | 11/1975 | Fed. Rep. of Germany . | |
| 3105137 | 1/1982 | Fed. Rep. of Germany | 123/422 |
| 22035 | 2/1979 | Japan | 123/424 |
| 51954 | 4/1980 | Japan | 123/422 |
| 104566 | 8/1980 | Japan | 123/422 |
| 2069603 | 8/1981 | United Kingdom | 123/423 |

*Primary Examiner*—Parshotam S. Lall
*Attorney, Agent, or Firm*—Cushman, Darby & Cushman

[57] ABSTRACT

The ignition timing of an internal combustion engine is controlled to a predetermined fixed value, not only during starting but also until the engine has rotated by a predetermined number of rotations after starting.

8 Claims, 10 Drawing Figures

*Fig. 7*
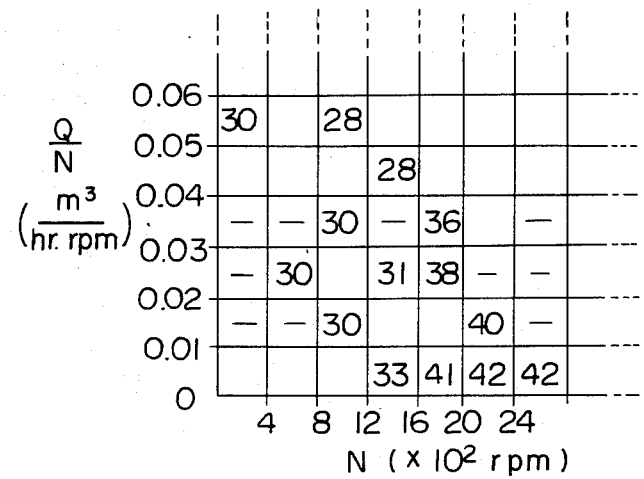
*Fig. 8a*  *Fig. 8b*
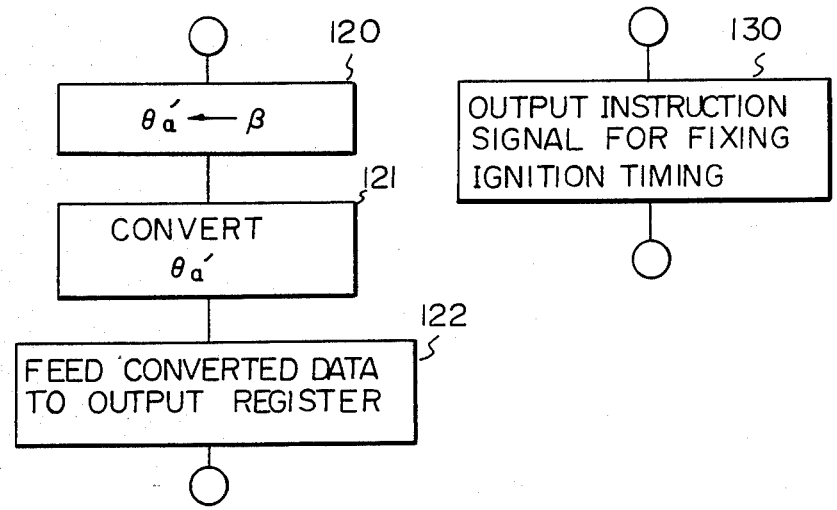

METHOD AND APPARATUS FOR CONTROLLING THE IGNITION TIMING OF AN INTERNAL COMBUSTION ENGINE

This is a continuation, of application Ser. No. 304,561, filed Sept. 22, 1981, abandoned as of the filing date of this application.

BACKGROUND OF THE INVENTION

The present invention relates to a method and apparatus for controlling the ignition timing of an internal combustion engine.

A well-known ignition timing control system of an internal combustion engine controls the ignition timing by detecting engine parameters that represent the operating conditions of an internal combustion engine, e.g., detecting the rotational speed of the engine, flow rate of the intake air, pneumatic pressure in the intake manifold, to calculate the ignition timing and to instruct the ignition at a calculated timing. In the system of this type, the ignition timing is often forcibly fixed to a predetermined constant value since the power-supply voltage supplied to the system and engine parameters which indicate the operation conditions, such as rotational speed, undergo great variation when the engine is in the starting condition. After starting, the ignition timing is controlled in an ordinary manner depending upon the detected parameters of operating conditions.

In general, however, there often develop great changes in the engine parameters such as rotational speed, flow rate of the intake air, and the like, immediately after starting of the engine. Therefore, if the ignition timing is controlled in an ordinary manner like the conventional control method just after starting, the time is not sufficient to carry the electric current to the ignition coil, and misfire develops, causing in the worst cases, the engine to stall.

SUMMARY OF THE INVENTION

It is, therefore, an object of the present invention to provide a method and apparatus for controlling the ignition timing of an internal combustion engine, whereby the operation of the engine just after starting can be stably maintained.

According to the present invention, a method of and apparatus for controlling the ignition timing of an internal combustion engine comprises detecting the operating condition of the engine to produce at least one first electrical signal which indicates the detected operating condition. In response to the produced first electrical signal, calculating a spark advance angle which corresponds to an optimum ignition timing at the detected operating condition. The timing of the sparks applied to the engine is adjusted depending upon the calculated spark advance angle. Whether the engine is in the starting condition is detected to produce a second electrical signal when the engine is in the starting condition. In response to the second electrical signal, detecting whether the engine has rotated by a predetermined number after starting, to produce a third electrical signal which indicates the detected result. In response to the second and third electrical signals, keeping the timing of the sparks applied to the engine at a predetermined fixed timing when the engine is in the starting condition, or until the engine has rotated by a predetermined number after starting.

The above and other related objects and features of the present invention will be apparent from the description of the present invention set forth below, with reference to the accompanying drawings, as well as from the appended claims.

BRIEF DESCRIPTION OF THE DRAWINGS

FIG. 7 is a map diagram illustrating the relationship of the spark advance angle relative to Q/N and N;

FIGS. 8a and 8b are flow diagrams illustrating part of another program for performing arithmetic operations with respect to the ignition control.

DETAILED DESCRIPTION OF THE PREFERRED EMBODIMENTS

Figure 1:
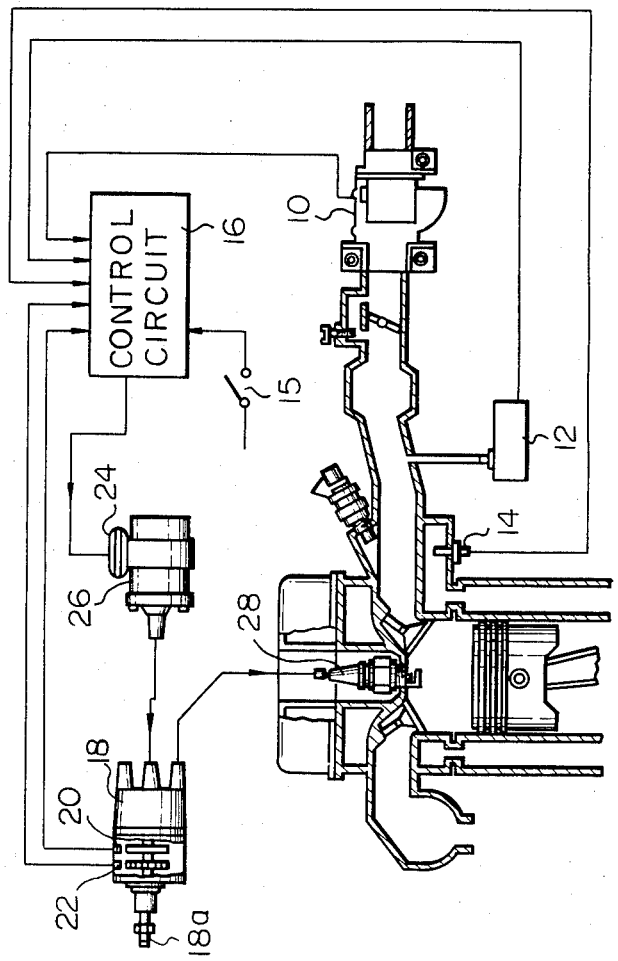
FIG. 1 is a schematic diagram illustrating a system to which the present invention is used.

Referring to FIG. 1, which schematically illustrates an ignition timing control system with a microcomputer of an internal combustion engine, reference numeral 10 denotes an air flow sensor which detects the flow rate of the air sucked into the engine to generate a voltage that corresponds to a detected value, 12 a pneumatic pressure sensor which detects the pneumatic pressure in an intake manifold of the engine to generate a voltage corresponding to a detected value, 14 a coolant temperature sensor which detects the temperature of the coolant to produce a voltage corresponding to a detected value, and 15 a starter switch which will be closed when cranking. A control circuit 16 is provided with output voltages from the air flow sensor 10, the pneumatic pressure sensor 12 and the coolant temperature sensor 14, and a signal from the starter switch 15 which indicates that the engine is cranking i.e., which indicates that the engine is in the starting condition.

A distributor 18 of the engine is equipped with a first crank angle sensor 20 and a second crank angle sensor 22. The sensor 20 generates an angular position signal every time the distributor shaft 18a has rotated by a predetermined crank angle of 360°. The other sensor 22 generates an angular position signal at every crank angle of 60°. The two angular position signals from the crank angle sensors are fed to the control circuit 16.

The control circuit 16 feeds an ignition signal to an igniter 24. A power transistor in the igniter 24 permits and interrupts the flow of a primary current to an ignition coil 26. A secondary current of a high voltage produced by the ignition coil 26 is fed to one of the spark plugs 28 via the distributor 18.

Figure 2:
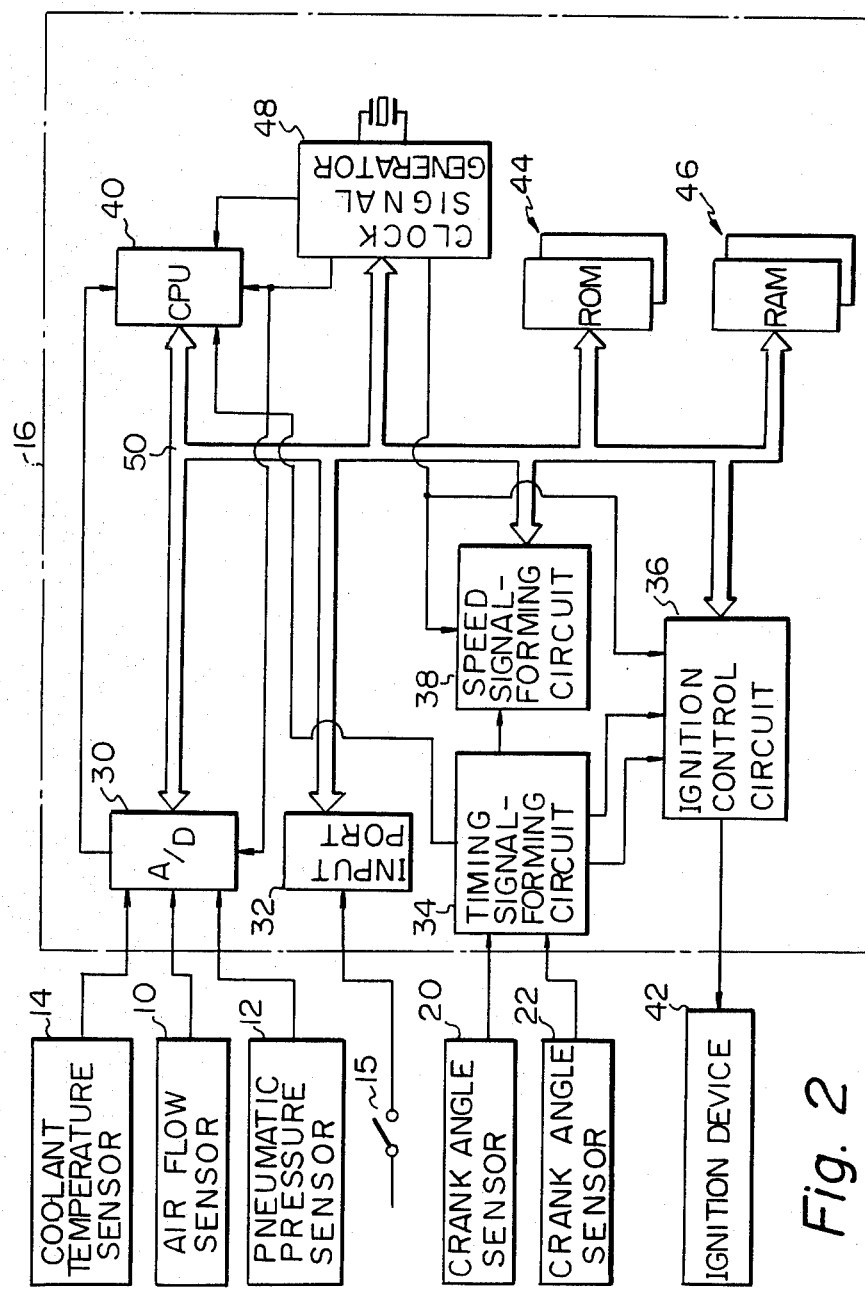
FIG. 2 is a block diagram illustrating the control circuit in FIG. 1.

FIG. 2 is a block diagram illustrating an embodiment of the control circuit 16 of FIG. 1.

Output voltages of the coolant temperature sensor 14, air flow sensor 10 and pneumatic pressure sensor 12 are fed to an A/D converter 30 which includes an analog multiplexer, and are successively converted into signals in the form of binary numbers. Further, the signal from the starter switch 15 is fed to an input port 32.

The angular position signals produced by the first and second crank angle sensors 20 and 22 at every crank angle of 360° and 60°, respectively, are fed to a timing signal-forming circuit 34 which forms various timing signals $S_{ld}$, $S_{bd}$ that will be fed to an ignition control circuit 36, an interrupt request signal $S_{irt}$ for calculating the ignition timing, and a gate control signal $S_g$ which will be fed to a speed signal-forming circuit 38.

The speed signal-forming circuit 38 has a gate that will be opened and closed by a gate control signal $S_g$ having a pulse width which corresponds to the crank angle of 60° fed from the timing signal-forming circuit 34, and a counter which counts the number of clock pulses that pass through the gate when the gate is opened each time. The speed signal-forming circuit 38 forms a binary speed signal having a value that corresponds to the rotational speed of the engine.

The ignition control circuit 36 forms an ignition signal in accordance with a first output data related to a timing for permitting the current to flow into the ignition coil 26 and a second output data related to a timing for stopping the current from flowing into the ignition coil 26, i.e., related to the ignition timing. The first and second output data are calculated by a central processing unit (CPU) 40. The formed ignition signal is fed to an ignition device 42 consisting of the spark plugs 28, the distributor 18, the ignition coil 26, and the like that are shown in FIG. 1.

The A/D converter 30, input port 32, speed signal-forming circuit 38, and ignition control circuit 36 are connected to the CPU 40, a read-only memory (ROM) 44, a random access memory (RAM) 46, and a clock generator circuit 48 via a bus 50. The input and output data are transferred via the bus 50.

Further, although not diagrammed in FIG. 2, the microcomputer is equipped with an input/output control circuit, memory control circuit and the like in a customary manner.

In the ROM 44 have been stored beforehand a program for a main processing routine, an interrupt processing program for calculating the ignition timing, and other processing programs, as well as various data necessary for performing arithmetic calculations, as will be mentioned later.

In FIGS. 1 and 2, the engine is equipped with both the air-flow sensor 10 and the pneumatic pressure sensor 12. The present invention, however, can be put into practice if either one of these sensors is provided.

Figure 3:
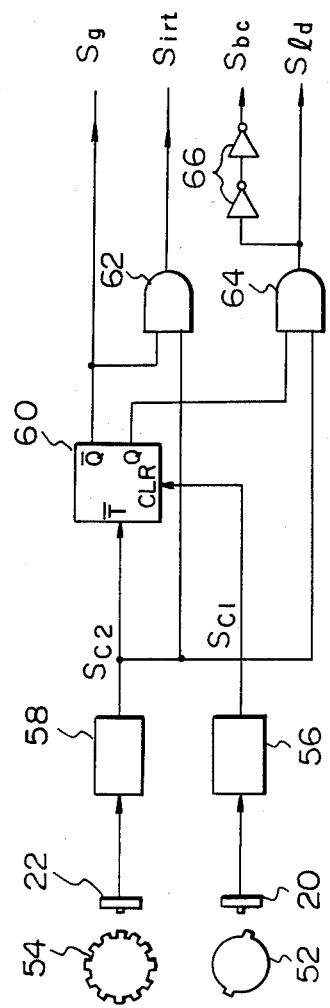
FIG. 3 is a block diagram illustrating the timing signal-forming circuit in FIG. 2.
Figure 4:
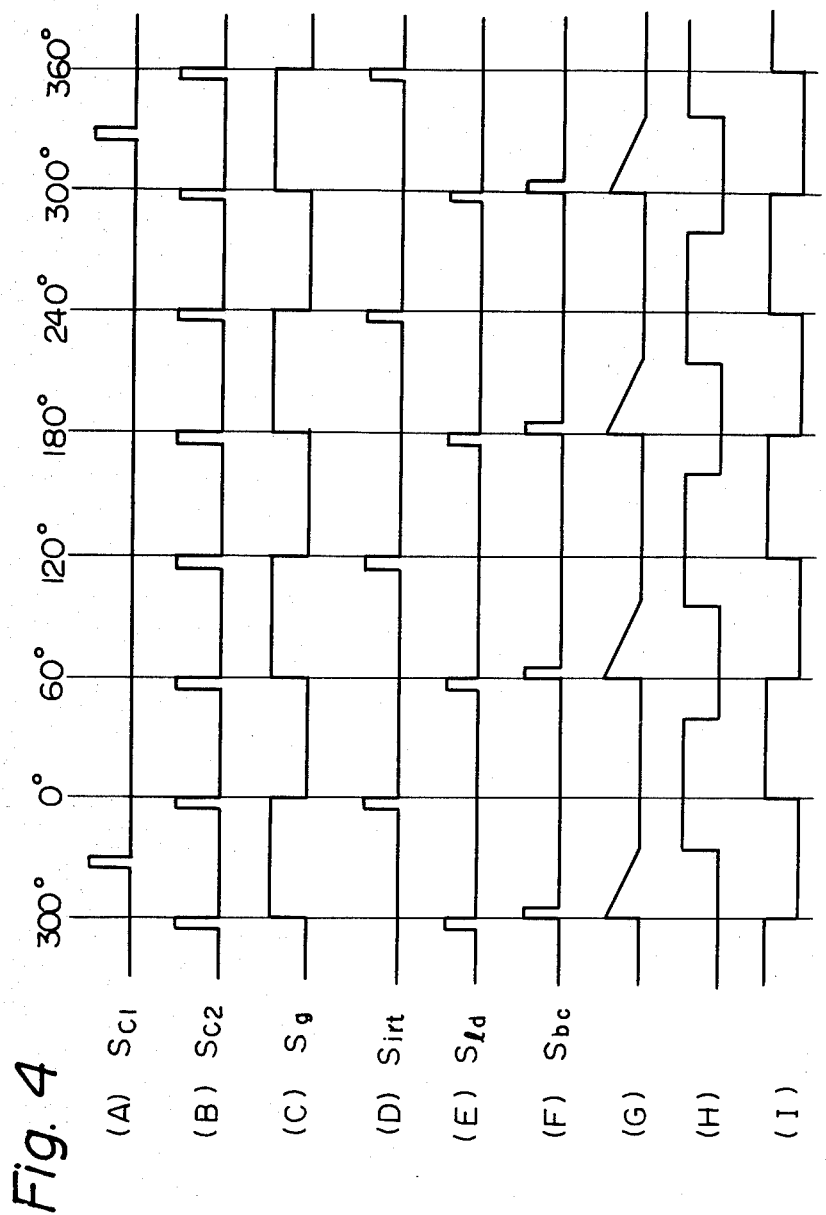
FIG. 4 illustrates nine wave forms of signals at each portion of the circuits in FIGS. 3, 5 and 9.

FIG. 3 illustrates one embodiment of the timing signal-forming circuit 34 of FIG. 2, in which reference numerals 52 and 54 denote magnetic discs which are attached to the distributor shaft and turn a half revolution for every turn of the crank shaft of the engine. Projections of a predetermined number are provided on the periphery of the discs 52, 54 at equal distances. As the projections pass by the crank angle sensors 20 and 22 consisting of magnetic pick-up sensors, pulses are produced every crank angle of 360° and 60°, respectively. The pulses from the sensors 20 and 22 are shaped by waveform shaping circuits 56 and 58, and are converted into crank angular position signals $S_{c1}$ and $S_{c2}$ as illustrated in the diagrams (A) and (B) of FIG. 4. FIG. 4 illustrates signal waveforms of each of the portions of the circuits of FIGS. 3, 5 and 9, in which the abscissa represents crank angles when the top dead center in the compression stroke of a given cylinder among many cylinders of the engine is set to zero.

A trigger-type flip-flop 60 is reset by the above-mentioned crank angular position signal $S_1$ to forcibly set its own outputs Q and $\overline{Q}$ to low and high levels, respectively. When the crank angular position signal $S_{c2}$ is applied, the outputs Q and $\overline{Q}$ of the flip-flop 60 are inverted. Therefore, the output $\overline{Q}$ of the flip-flop 60 serves as a gate control signal $S_g$ as shown in the diagram (C) of FIG. 4. The output of an AND gate 62 which receives the gate control signal $S_g$ and the crank angular position signal $S_{c2}$, serves as in interrupt request signal $S_{irt}$. The negative edge of the interrupt request signal $S_{irt}$ appears at the crank angular positions of 0°, 120° and 240°, or in other words, appears at the top dead center in every compression stroke of each of the cylinders, as shown in the diagram (D) of FIG. 4. Further, the output of an AND gate 64 which receives the output Q of the flip-flop 60 and the crank angular position signal $S_{c2}$, serves as a load timing signal $S_{ld}$. The negative edge of the load timing signal $S_{ld}$ appears at the crank angular positions of 60°, 180° and 300°. A reference angular position signal $S_{bc}$ as shown in the diagram (F) of FIG. 4 is formed by slightly delaying the load timing signal $S_{ld}$ with respect to time in a delay circuit 66.

Figure 5:
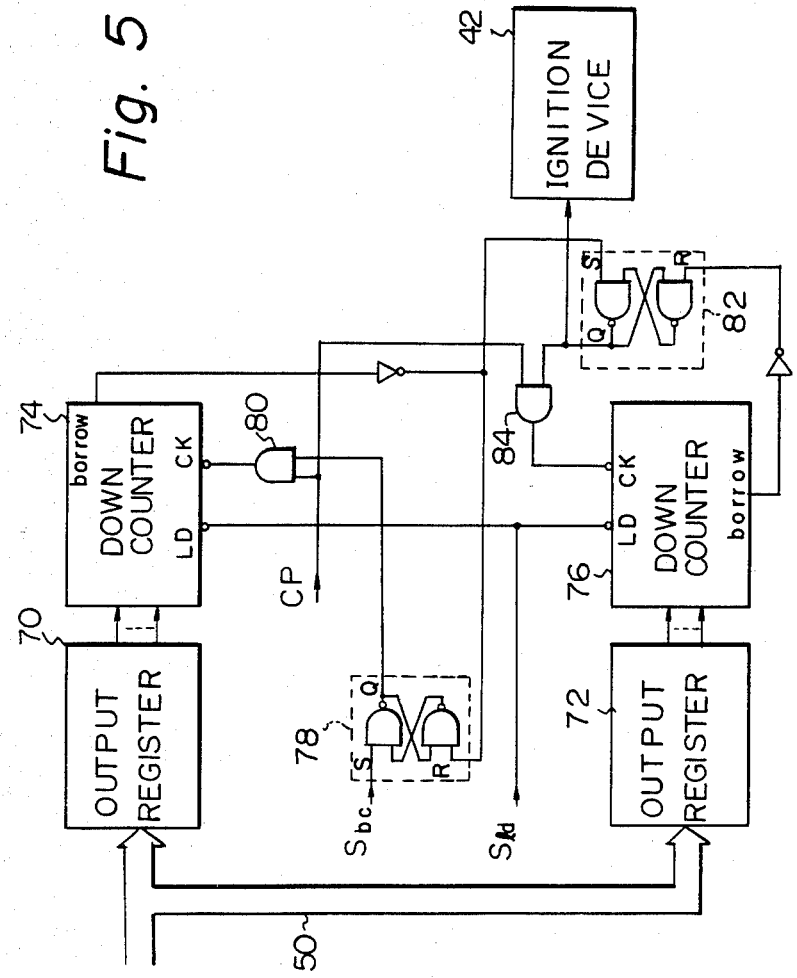
FIG. 5 is a block diagram illustrating one example of the ignition control circuuit in FIG. 2.

FIG. 5 illustrates the construction of one example of the ignition control circuit 36 of FIG. 2, in which reference numeral 70 denotes an output register which receives the second output data corresponding to the ignition timing from the CPU 40 via the bus 50, and 72 denotes an output register which receives the first output data related to the timing for commencing the flow of electric current. When the load timing signal $S_{ld}$ is applied, the above data received by the output registers 70 and 72 are input to presettable down counters 74 and 76, respectively. When the reference angular position signal $S_{bc}$ is applied slightly lagging behind the load timing signal $S_{ld}$, a flip-flop 78 is set. Thus, clock pulses CP from the clock generator circuit 48 (FIG. 2) are applied to the down counter 74 via an AND gate 80, and the down counter 74 commences the counting operation. When the second output data preset into the down counter 74 is counted down to zero, a flip-flop 82 is set by a borrow output from the down counter 74, and also by this borrow output, the flip-flop 78 is reset. The diagram (G) of FIG. 4 illustrates the content of the down counter 74 when the data is being counted while calculating the variable spark advance angle. When the flip-flop 82 is set, the down counter 76 commences to count down in response to the clock pulses CP. When the down counter 76 to which the first output data related to the timing for commencing the flow of current is preset, is counted down to zero, the flip-flop 82 is reset by the borrow output from the down counter 76. Therefore, when the variable spark advance angle is calculated, the output Q of the flip-flop 82 becomes as shown, for example, in the diagram (H) of FIG. 4, and is fed as an ignition signal to the ignition device 42. Namely, the spark is effected at the moment when the ignition signal rises, and the electric current is supplied to the ignition coil 26 at the moment when the ignition signal falls.

Below are illustrated operations of the microcomputer in FIG. 2. The following description deals with the case when the air flow sensor 10 is used instead of the pneumatic pressure sensor 12.

Figure 6:
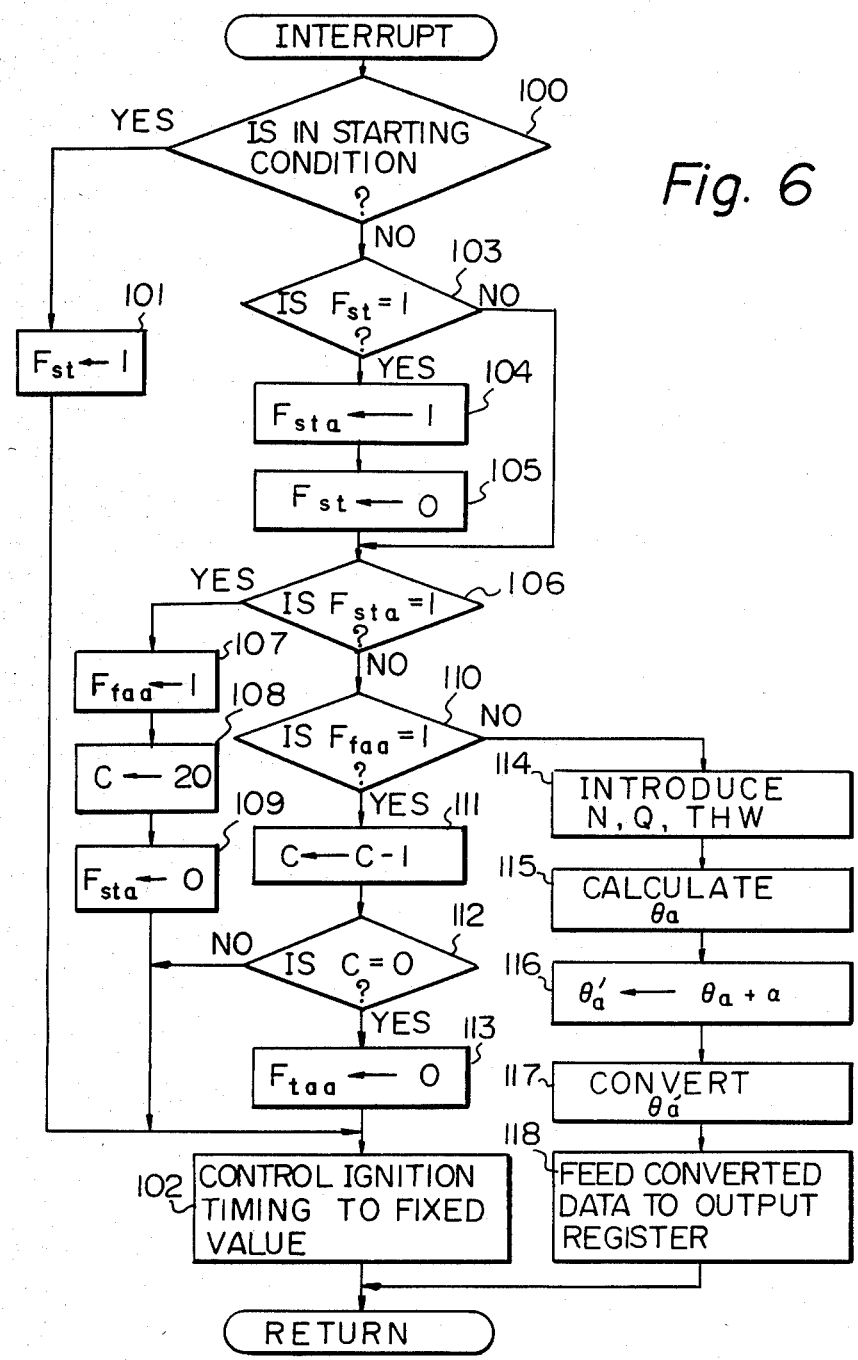
FIG. 6 is a flow diagram illustrating a program for performing arithmetic operations with respect to the ignition control.

When the interrupt request signal $S_{irt}$ is fed from the timing signal-forming circuit 34, the CPU 40 executes the steps which are illustrated in FIG. 6. First, at a point 100, the CPU 40 discriminates whether the engine is in the starting condition or not, by relaying upon a signal which is applied to the input port 32 from the starter switch 15. When the engine is in the starting condition, the starting flag $F_{st}$ is set to "1" at a point 101, and the program proceeds to a point 102 where the ignition timing is controlled to a predetermined fixed value. Namely, the ignition timing is controlled to a predetermined fixed value during starting. This process for controlling the ignition timing to a fixed value will be explained later.

After starting of the engine, the program proceeds from the point 100 to a point 103 where it is discriminated whether the starting flag $F_{st}$ is "1" or not. In the initial operation cycle just after starting, since the starting flag $F_{st}$ is "1" the program proceeds to points 104 and 105. At the point 104, a just after starting flag $F_{sta}$ is set to "1", and then the starting flag $F_{st}$ is reset to "0" at the point 105. At a point 106, then, the CPU 40 discriminates whether the flag $F_{sta}$ is "1" or not. Since the flag $F_{sta}$ remains at "1" in the initial operation cycle after starting, the program proceeds to a point 107 where a fixed spark advance angle flag $F_{faa}$ is set to "1". In a point 108, an initial value "20" is set to a counter C. Then, the flag $F_{sta}$ is reset to "0" at a point 109. The program then proceeds to a point 102. When the engine is not under a high-speed operating condition, the program proceeds to the point 102 to fix the ignition timing.

In the second and subsequent operation cycles after starting the engine, since the starting flag $F_{st}$ is "0", the program jumps from the point 103 to a point 106. Further, since the flag $F_{sta}$ is also "0", the program proceeds from the point 106 to a point 110 where it is discriminated whether the fixed spark advance angle flag $F_{faa}$ is "1" or not. In the second operation cycle after starting, since the flag $F_{aa}$ is "1", the program proceeds to a point 111 where the counter value C is reduced by "1". Namely, the calculation of $C \leftarrow C-1$ is carried out. Then, at a point 112 it is discriminated whether C=0 or not. When C is not "0", the program proceeds from the point 112 to a point 102 to fix the ignition timing. When the arithmetic calculation is performed 20 times at the point 111 so that the value C becomes zero, the program proceeds from the point 112 to the point 113 where the flag $F_{faa}$ is reset to "0". Then the program proceeds to the point 102 to fix the ignition timing. Thus, the ignition timing is fixed over a period of 21 times of operation cycles inclusive of the initial setting of the counter value C after starting. Thereafter, since the flag $F_{faa}$ remains at zero, the program is branched from the point 110 to a point 114. Points 114 to 118 form a routine for processing an ordinary ignition timing calculation.

At the point 114, the CPU 40 introduces the input data related to the rotational speed N of the engine, the input data related to the flow rate Q of the intake air and the input data related to the coolant temperature THW. At the point 115, then the CPU 40 finds an optimum spark advance angle $\theta_a$ suitable for the operating condition of that time relying upon the data of the amount Q of intake air and the data of the rotational speed N. A variety of methods are known to calculate the optimum spark advance angle. Referring, for example, to FIG. 7, a function $\theta_a = f(N, Q/N)$ which represents a desirable relationship among N, Q/N and the spark advance angle $\theta_a$, is stored beforehand in the ROM 44 in the form of a map, and the optimum spark advance angle $\theta_a$ is found by mapping. The found spark advance angle $\theta_a$ is corrected in the next point 116 in response to a function $\alpha = g(THW)$ of the coolant temperature THW. Namely, the spark advance angle $\theta_a$ is corrected by the operation $\theta_a' \leftarrow \theta_a + \alpha$ to find the spark advance angle $\theta_a'$. At the next point 117, a crank angle $\theta_b$ between a crank angular position represented by the above found spark advance angle $\theta_a'$ and the reference angular position is determined. According to the embodiment of the present invention, the reference angular position which is advanced by 60° from the top dead center in the compression stroke of a cylinder that is to be ignited, is employed, i.e., 60° CA·BTDC, is employed. Therefore, the crank angle $\theta_b$ can be found by $\theta_b = 60 - \theta_a'$. Then, the calculated crank angle $\theta_b$ is converted into a unit of time. The conversion is to calculate the time $T_b$ which is required by the crank shaft to turn by the angle $\theta_b$, and can be easily effected according to $T_b = (\theta_b/N)$ by utilizing the rotational speed N of that moment. Then, the found time $T_b$ is converted into a clock number for the down counter 74. The conversion is effected according to $$\frac{T_b}{12.5 \ \mu sec}$$

if the period of the clock pulses is 12.5 μsec. In the next point 118, the conversion data is fed, as ignition timing data (as second output data), to the output register 70.

On the other hand, the CPU 40 calculates in a customary manner the time from the present ignition timing to a time at which the electric current starts to flow into the primary winding of the ignition coil to effect the spark in the next cylinder, i.e., calculates the time $T_{off}$ from the present ignition timing to a time at which the electric current commences to flow for preparing the spark in the next cylinder. The CPU 40 then converts the calculated off-current time $T_{off}$ into a clock number for the down counter 76, and feeds the converted data to the output register 72 as a first output data.

Below is illustrated the processing for controlling the ignition timing to a fixed value at the point 102. When the ignition control circuit 36 of the construction shown in FIG. 5 is used, the ignition timing is fixed by the software technique. Namely, the point 102 executes the processing which is illustrated in FIG. 8a. First, a predetermined fixed angle β (for example β=0° CA BTDC) is given in a point 120 as a final spark advance angle $\theta_a'$, and points 121 and 122 execute the same processings as those of the respective points 117 and 118 of FIG. 6, so that an ignition timing data corresponding to the fixed spark advance angle β is fed to the output register 70. Furthermore, the data related to a timing for initiating the flow of current corresponding to a predetermined off current time $T_{off}$ (e.g., $T_{off}$=3 msec.), is also fed to the output register 72.

Figure 9:
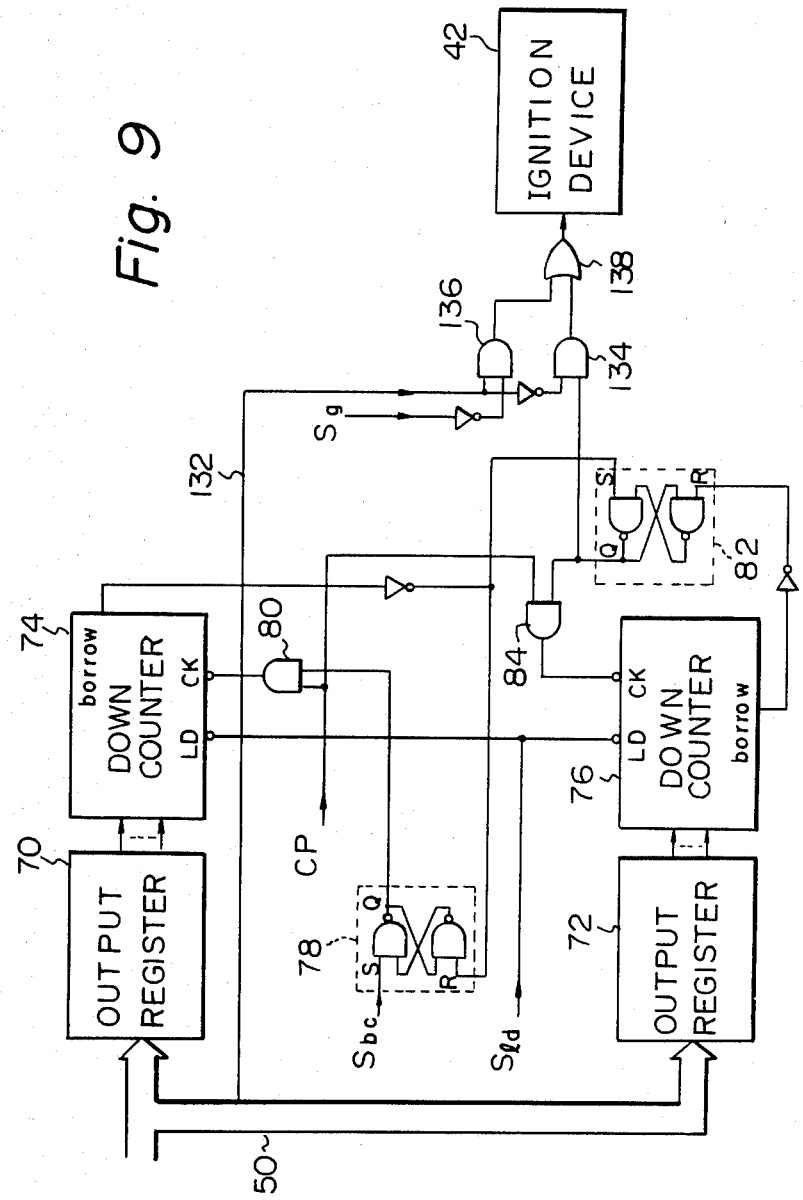
FIG. 9 is a block diagram illustrating another example of the ignition control circuit in FIG. 2.

According to the present invention, however, the ignition timing may be controlled to a fixed value by the hardware technique using an ignition control circuit which is shown in FIG. 9. In this case, the point 102 executes the processing of a point 130 of FIG. 8b. Namely, a signal of the logic "L" for instructing the fixed ignition timing is fed to a line 132 of FIG. 9, whereby an AND gate 134 is closed and an AND gate 136 is opened. Therefore, an inverted signal (refer to FIG. 4(I)) of the gate control signal $S_g$ from the timing signal-forming circuit 34 is applied to the ignition device 42 via an OR gate 138 in place of the ignition signal from the flip-flop 82. Therefore, the ignition timing is fixed to 0° C. CA BTDC. It is further possible to control the ignition timing to a fixed value by the hardware technique when the engine is in the starting condition where the power-supply voltage is dropped, and by the software technique after starting the engine.

According to the above-mentioned embodiment, the interrupt processing routine for calculating the ignition timing is executed every time the crank shaft of the engine has turned a predetermined angle. Therefore, the process for fixing the ignition timing is effected when the engine does not run at high speeds during starting or until the engine rotates by a predetermined number of rotations after starting. According to another embodiment of the present invention, the interrupt processing program may be executed for a predetermined period of time. In this case, the process for fixing the ignition timing will be effected when the engine does not run at high speeds during starting or until a predetermined period of time has elapsed after starting.

According to the method of the present invention as illustrated in detail in the foregoing, the ignition timing is controlled to a predetermined fixed value not only when the engine is in the starting condition, but also until a predetermined period of time has elapsed after starting, or until a predetermined number of revolutions of the engine after starting. Therefore, even when the engine parameters are greatly varied immediately after starting, the operation of the engine can be stably maintained without inviting misfire or without causing the engine to stall.

Although the above-mentioned embodiment has employed the rotational speed and the flow rate of the intake air as operating condition parameters for calculating the ignition timing, it is of course allowable to employ the rotational speed and the pneumatic pressure in the intake manifold as the operating condition parameters.

As many widely different embodiments of the present invention may be constructed without departing from the spirit and scope of the present invention, it should be understood that the present invention is not limited to the specific embodiments described in this specification, except as defined in the appended claims.

We claim:

1. A method of controlling the ignition timing of an internal combustion engine, comprising the steps of:
   detecting the operating condition of the engine to produce at least one first electrical signal which indicates the detected operating condition;
   calculating, in response to the produced first electrical signal, a spark advance angle which corresponds to an optimum ignition timing at the detected operating condition;
   adjusting the timing of the sparks applied to the engine in response to said calculated spark advance angle;
   detecting whether the engine is in the starting condition to produce a second electrical signal;
   detecting, in response to said second electrical signal, whether a total number of engine revolutions after starting reaches a predetermined number, to produce a third electrical signal which indicates the detected result; and
   keeping, in response to said second and third electrical signals, the timing of the sparks applied to the engine at a predetermined fixed timing when the engine is in the starting condition until a total number of engine revolutions after starting reaches a predetermined number.

2. A method as claimed in claim 1, wherein said keeping step includes a step of keeping the spark advance angle at a predetermined constant value when the engine is in the starting condition until a total number of engine revolutions after starting reaches a predetermined number.

3. A method as claimed in claim 1, wherein said keeping step includes the steps of:
   producing a fourth electrical signal when the engine is in the starting condition until a total number of engine revolutions after starting reaches a predetermined number; and
   forcibly fixing, in response to said fourth electrical signal, the timing of the sparks applied to the engine to a predetermined timing by means of predetermined crank angle signals.

4. A method as claimed in claim 1, wherein said engine has an intake manifold and said operating condition detection step includes the steps of:
   detecting the rotational speed of the engine to produce an electrical signal which indicates the detected rotational speed; and
   detecting one of the flow rate of air sucked into the engine and the pneumatic pressure in the intake manifold, to produce an electrical signal which indicates one of the detected flow rate of the intake air and the detected pneumatic pressure.

5. An apparatus for controlling the ignition timing of an internal combustion engine, comprising:
   means for detecting the operating condition of the engine to produce at least one first electrical signal which indicates the detected operating condition;
   means for calculating, in response to the produced first electrical signal, a spark advance angle which corresponds to an optimim ignition timing at the detected operating condition;
   means for adjusting the timing of the sparks applied to the engine in response to said calculated spark advance angle;
   means for detecting whether the engine is in the starting condition to produce a second electrical signal;
   means for detecting, in response to said second electrical signal, whether a total number of engine revolutions after starting reaches a predetermined number, to produce a third electrical signal which indicates the detected result; and
   means for keeping, in response to said second and third electrical signals, the timing of the sparks applied to the engine at a predetermined fixed timing when the engine is in the starting condition until a total number of engine revolutions after starting reaches a predetermined number.

6. An apparatus as claimed in claim 5, wherein said keeping means includes means for keeping the spark advance angle at a predetermined constant value when the engine is in the starting condition until a total number of engine revolutions after starting reaches a predetermined number.

7. An apparatus as claimed in claim 5 further including means for producing predetermined crank angle signals, and wherein said keeping means includes:

means for producing a fourth electrical signal when the engine is in the starting condition until a total number of engine revolutions after starting reaches a predetermined number; and means for forcibly fixing, in response to said fourth electrical signal, the timing of the sparks applied to the engine to a predetermined timing by means of said predetermined crank angle signals.

8. An apparatus as claimed in claim 5, wherein said engine has an intake manifold and said operating condition detection means includes:

means for detecting the rotational speed of the engine to produce an electrical signal which indicates the detected rotational speed; and means for detecting one of the flow rate of air sucked into the engine and the pneumatic pressure in the intake manifold, to produce an electrical signal which indicates one of the detected flow rate of the intake air and the detected pneumatic pressure.

* * * * *